July 7, 1959
L. H. FLORA
2,893,458
HANDLE MOUNTING DEVICE
Filed March 5, 1956
2 Sheets-Sheet 1
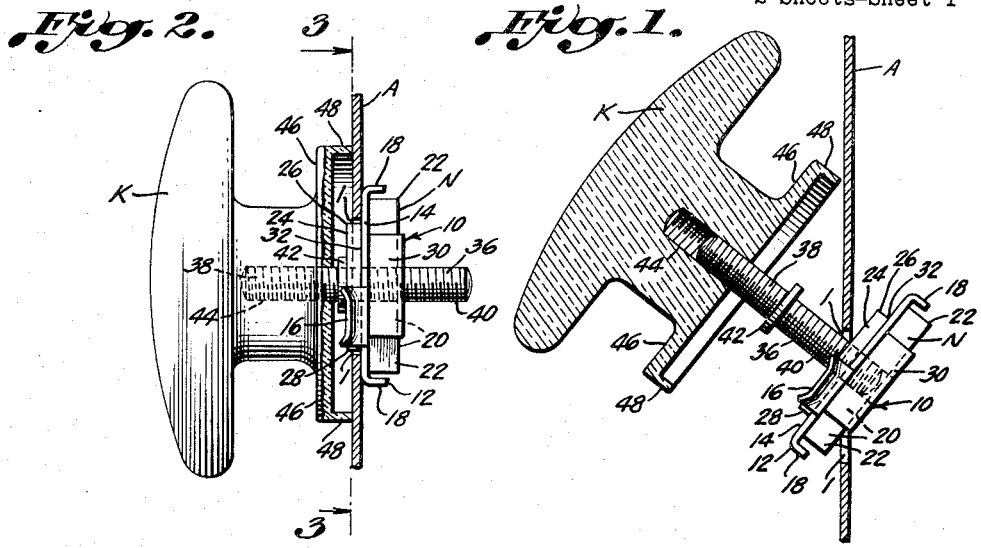
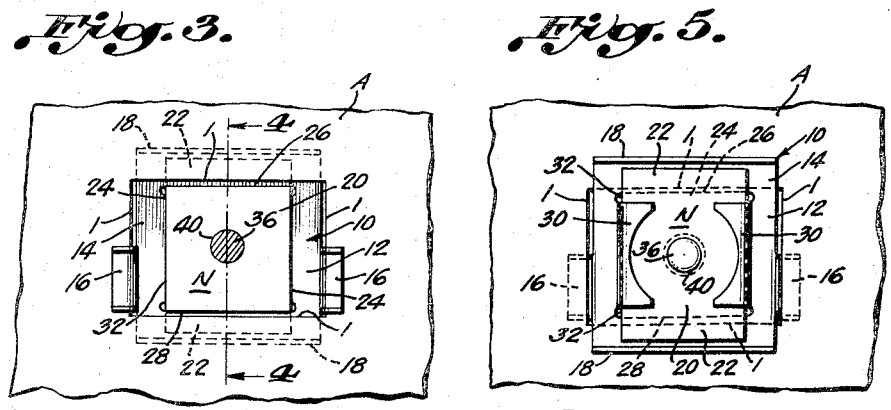
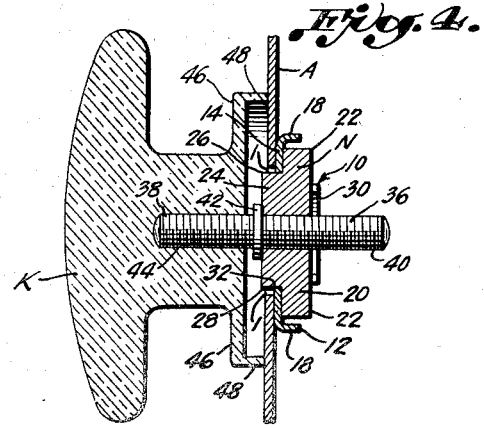
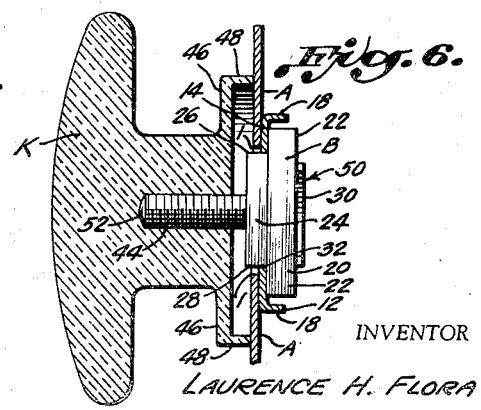
INVENTOR
LAURENCE H. FLORA
BY
ATTORNEY July 7, 1959 — L. H. FLORA — 2,893,458
HANDLE MOUNTING DEVICE
Filed March 5, 1956 — 2 Sheets-Sheet 2

INVENTOR
LAURENCE H. FLORA
BY
ATTORNEY

United States Patent Office 2,893,458
Patented July 7, 1959

2,893,458

HANDLE MOUNTING DEVICE

Laurence H. Flora, Cleveland, Ohio, assignor to Tinnerman Products, Inc., Cleveland, Ohio, a corporation of Ohio Application March 5, 1956, Serial No. 569,512

5 Claims. (Cl. 151—41.75)

This invention relates in general to the mounting or securing of articles and objects such as knobs, handles, and the like, and deals, more particularly, with an improved means for easily and quickly assembling and securing such articles and objects in mounted position in an installation.

A primary object of the invention is to provide a simplified and inexpensive mounting for a knob, handle or other article or object by means comprising a bolt or nut member combined with a clip member in a securing device adapted to be attached in fastening position on a wall or panel by an operation taking place entirely from the outer or forward side thereof. Such a procedure is necessary and desirable in what are known as blind locations and in many constructions as the final step in a method of assembly for mounting or securing an article or object onto a supporting wall or panel which is not conveniently or readily accessible at the rearward side thereof to complete the securing operation.

Another object of the invention is to provide a mounting or securing means, such as described, which comprises an attaching member in the form of a sheet metal spring clip that operates in the manner of a snap fastener to retain a bolt or nut in attached position on a supporting wall or panel for mounting or securing a knob, handle or other article or object thereon. The arrangement, accordingly, is such that the invention provides a mounting or securing means for a knob, handle or other article or object which combines the strength and durability of a nut or bolt fastening member with the speed and facility in assembly provided by the spring clip attaching member.

Further objects and advantages and other new and useful features in the construction, arrangement and general combination of elements of the invention will be apparent as the following description proceeds with references to the accompanying drawings, for purposes of illustration but not of limitation, in which like reference characters designate like parts throughout, and in which:

Fig. 1 shows one form of the invention as provided in a securing device for a knob or handle to be mounted over a panel opening by application entirely from the outer or forward side of the panel, the securing device being shown as tilted in initially applied position in the panel opening;

Fig. 2 is a view similar to Fig. 1 showing the securing device as fully attached in the panel opening to complete the mounting of the knob or handle;

Fig. 3 is a view on line 3—3 of Fig. 2 looking in the direction of the arrows, and shows the attachment of the securing device in the panel opening as seen from the forward side of said panel;

Fig. 4 is a sectional view of Fig. 3 on line 4—4, looking in the direction of the arrows; and Fig. 5 is a vertical elevational view from the right of Fig. 2 and shows the attachment of the securing device in the panel opening as seen from the rearward side of the panel.

Fig. 6 is a sectional view similar to Fig. 4 showing a further form of securing device in accordance with the invention comprising a bolt providing a mounting for a knob or handle in the manner shown in Figs. 1–5, inclusive.

Figure 8:
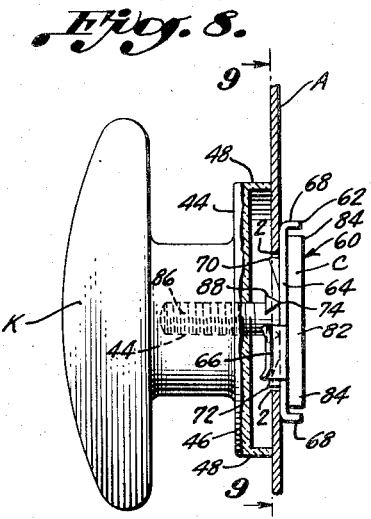
Fig. 8 is a view similar to Fig. 7 showing the securing device as fully attached in the panel opening to complete the mounting of the knob or handle.

In many assemblies, it is often necessary or desirable for the knobs, handles and other auxiliary attachments to be mounted when the structure is completed or set up ready for use, and to this end, it is usually found expedient to provide a securing means which, of course, is concealed and otherwise adapted to provide the desired mounting without requiring access to the interior of the structure in what are known generally as blind fastening assemblies.

Referring now, more particularly, to the drawings, Figs. 1–5, inclusive, show one form of mounting or securing means in accordance with the invention comprising a nut N applied in a blind fastening assembly to mount a knob K, handle or other article or object onto a wall or panel A defining the outer surface of a door, closure or other panel member, or the like. At the predetermined location of the mounting, the panel or wall member A is provided with an assembling opening 1 which is usually punched therein prior to the assembly thereof in a completed structure whereupon said panel opening 1 becomes accessible only from the forward or outer side of the wall or panel A; and it is this condition which makes it essential that the means for securing the knob, handle or other object or part to the supporting wall A be capable of assembly to complete and fully effective fastening position in the panel opening 1 by an assembling operation taking place entirely from the forward or accessible side of said wall or panel A. The assembling or panel opening 1 is shown provided in a generally rectangular formation but, of course, such an opening may be formed in a circular or other selected configuration with the securing device constructed for attachment in any such opening in accordance with the present disclosure. The panel or wall member A may be of any suitable metal, wood, plastic or fiber board construction, or the like, but inasmuch as the invention is used mainly in metallic structures, said panel A is usually in the form of a metal plate or panel in which the assembling opening 1 may be punched or otherwise provided just as readily as the usual bolt passage is prepared therein.

The securing device, designated generally 10, Figs. 1–5, inclusive, comprises a combined sheet metal clip or attaching member 12 and a clamping member in the form of a nut N. The sheet metal clip or attaching member 12 is a relatively simple, inexpensive article of manufacture adapted for economical quantity production from standard sheet metal strip stock with little loss or waste of material. The clip may be made from any suitable sheet metal preferably that of a spring metal nature such as spring steel or cold rolled steel having spring like characteristics. The blank for the sheet metal clip or attaching member is so provided as to define a base 14, Fig. 3, having a width slightly less than the longer dimension of the generally rectangular panel opening 1 and a length greater than the shorter dimension of said panel opening 1. Thus, the base 14 of clip is adapted to pass through the panel opening 1 from the outer or forward side of said panel A as shown in Fig. 1 to fastening position at the rearward side thereof where the ends of said base 14 bear on the panel adjacent said panel opening 1 as seen in Fig. 2.

The opposite sides of said base 14 are provided with integral lateral wings or projections 16 adapted to extend beyond the sides of the panel opening 1 to prevent the securing device 10 from passing completely through said panel opening in the assembling operation. The lateral projections 16 are positioned nearer to the trailing end of the base 14 and are offset below said base 14 a distance slightly less the thickness of the panel A such that said lateral projections 16 are adapted for resilient engagement with marginal portions of the panel opening 1 at the outer or forward side of the panel A in cooperation with the ends of the base 14 engaging the rearward side of said panel A adjacent said panel opening 1, as aforesaid. Preferably the edges of said lateral projections 16 are rounded or flared outwardly to define tapered cam surfaces on said edges, and the extremities of the base 14 are bent outwardly in blunt rounded surfaces 18 which facilitate the application thereof in the attachment of the securing device 10 in the panel opening 1, as presently to be described.

The base 14 is suitably formed for retaining the selected type of clamping member in the form of a nut, as shown in Figs. 1–5, inclusive, or a bolt B as seen in Fig. 6. An important feature resides in the use of such a clamping member having a projection or extension at the underface of the base 14 of the clip which is received in the panel opening 1 in abutting relation to the wall of said panel opening 1 to serve as a locking shoulder or detent retaining the securing device in attached position in said panel opening 1. In the present example, the clamping member is in the form of a nut N having a head 20 defining end flanges 22 extending to a size greater than the shorter dimension of the panel opening 1 and a smaller reduced size projection or collar 24 adjacent said head 20. The collar 24 defines locking shoulders or detents 26, 28, having a spacing slightly less than said shorter dimension of the panel opening 1 so as to be receivable therein in close abutting relation to the adjacent edges of said panel opening 1.

The base 14 of the clip or attaching member is provided with a central area cut to define a pair of arms 30 having free ends extending inwardly toward each other. Preferably said arms 30 are formed by a pair of spaced parallel slots and an intermediate transverse slot providing said arms 30 with spaced curved extremities as seen in Fig. 5. The arms 30 are bent outwardly out of the plane of the base 14 such that said base 14 is provided with an aperture 32 corresponding to and slightly larger than the cross section of the collar 24 on the nut member N. In the assembly of the clip member 12 with the nut member N, the collar 24 of the nut extends through the aperture 32 in the base 14 of the clip with the locking shoulders or detents 26, 28, thereon projecting from the underside of said base 14 and the end flanges 22 of said nut N bearing on the upper side of said base 14 adjacent said aperture 32.

The arms 30 are bent to extend over the top of the nut N or head portion 20 to retain said nut N and clip member 12 in a fixed, nonrotatable relation provided for by said generally rectangular collar 24 on the nut N received in the correspondingly shaped aperture 32 in the base 14 of the clip. If desired, the nut N may be provided with a floating mounting on the clip 12 by the use of an oversize aperture 32 in the base 14 loosely receiving the collar 24 on the nut and with the arms 30 slightly spaced from the top of the nut N to permit limited shifting of said nut N as may be necessary or desirable for aligning the thread opening in the nut with the bolt to be applied thereto.

The securing device 10, thus provided, is readily adapted for use as a blind fastener which is applied as shown in Fig. 1 from the forward side of the supporting panel A to position the same at the rearward side thereof for receiving a bolt securing a cooperating part to said panel A. To this end, a tool may be provided having a threaded end adapted to be threaded into the nut N to define a shank for manipulating the securing device 10 to attached position in the panel opening 1. In the present example, the equivalent of such a tool is provided by a bolt 36 having one end 38 threaded into a bore in the knob or handle K and the other end 40 adapted to be threaded into the nut N to the extent limited by an integral lug or ring 42 defining a stop on said bolt 36. The knob K may be made of any suitable material such as plastic, metal, etc., and formed with a bore 44 and a flange 46 carrying a peripheral skirt 48 providing suitable clearance of said flange 46 from the securing device 10 when attached in the panel opening 1 and otherwise concealing said securing device 10 in the completed mounting of the knob K.

As shown in Fig. 1, the securing device 10 is initially applied to attached position in the panel opening 1 by using the bolt 36 for manipulating the same or by providing a similar tool for this purpose, as aforesaid. The projecting end 40 of the bolt 36 is extended to the required length by unscrewing the bolt end 38 from the bore 44 in the knob K as necessary for this purpose. The knob K and bolt 36 are thus used as a tool to tilt the securing device 10 as seen in Fig. 1 in a manner to pass the upper or leading end of the securing device through the panel opening 1 from the forward side of the panel A to the rearward side thereof until limited by the lateral projections 16 engaging marginal portions of the panel opening 1 at the forward side of said panel A. In this position, the lower or trailing end of the securing device 10, is aligned to clear the panel opening 1 as necessary for the remainder of the nut N and base 14 of clip to pass through said panel opening 1. The securing device 10 is then shifted reversely toward the trailing end of the securing device 10 to the position shown in Fig. 2 where the locking shoulders or detents 26, 28, on the collar 24 of the nut N snap into the panel opening 1 and are seated in abutting relation to the adjacent edges thereof to lock the securing device 10 in attached fastening position in said panel opening 1.

The bolt 36 is then drawn up by turning the same with the knob K to thread the free end 40 of the bolt into the nut N until limited by the stop 42, whereupon the knob K is fully threaded onto the other end 38 of said bolt until the skirt 48 of said knob is in firm, bearing engagement with the panel A to complete the mounting of said knob K on said panel A. The securing device 10 is applied in a similar manner using a tool having an end portion threaded into the nut N, and when the securing device is fully attached in the panel opening 1, the tool is removed by unthreading the same from the nut N thereby clearing the nut N for application of a cooperating bolt to secure an object or part to said supporting panel A.

Fig. 6 shows another form of the invention in which the securing device 50 comprises a bolt B provided with a head defining a clamping member approximating the size and shape of the clamping member provided by the nut member N in the embodiment of Figs. 1–5, inclusive. The clip or attaching member 12 is the same and the bolt B includes a similar clamping member comprising a head 20, end flanges 22, and collar 24 on the underside of said head 20 together with an integral bolt shank 52 depending from said collar 24. The integral bolt shank 52 is used in place of a tool for applying the securing device 50 to attached position in the panel opening 1 in the same manner described with reference to Figs. 1–5, inclusive, in which relation, said integral shank 52 projects from the outer or forward side of said panel A in position for the similar knob or handle K to be threaded thereon or an associated nut threaded onto said projecting shank 52 to secure a cooperating part to said panel A.

In the foregoing embodiments of the invention, it will be appreciated that the clamping member provided by the nut member N in Figs. 1–5, inclusive, and the head of the bolt B in Fig. 6, includes an extension in the form of a collar 24 defining the locking shoulders or detents 26, 28, projecting from the underface of the base 14 and serving to positively retain the securing device in attached position in the panel opening 1. The invention fully contemplates any other similar construction comprising a clamping member provided by a nut or bolt head having a lug or abutment which projects from the underface of the base 14 of the clip to serve said purpose of a locking shoulder or detent in abutting relation to the wall of the panel opening 1 to retain the securing device in attached position in said panel opening 1.

Figure 7:
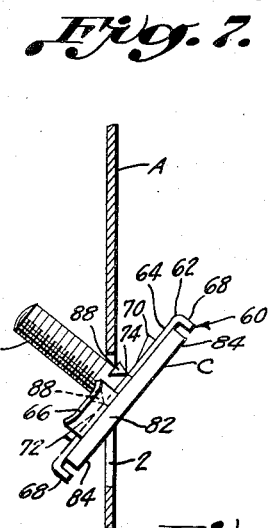
Fig. 7 shows another form of the invention as provided in a securing device comprising a bolt for mounting a knob or handle over a panel opening by application entirely from the forward side of the panel, the securing device being shown as tilted in initially applied position in the panel opening.

Figs. 7–11, inclusive, disclose a further form of the invention in which the securing device 60 comprises a bolt C having a head defining a clamping member and a shank by which the securing device is applied to attached position in an assembling opening 2 in a panel A in the general manner described with reference to the embodiment of Figs. 1–6, inclusive. The sheet metal clip or attaching member 62 is so provided as to define a base 64 having a width slightly less than the width of the generally rectangular panel opening 2 and a length greater than the length of said panel opening 2. Thus, the base 64 of clip is adapted to pass through the panel opening 2 from the outer or forward side of said panel A, as shown in Fig. 7, to fastening position at the rearward side thereof where the ends of said base 64 bear on the panel adjacent said panel opening 2, as seen in Fig. 8.

The opposite sides of said base 64 are provided with integral lateral wings or projections 66 adapted to extend beyond the panel opening 2 to prevent the securing device from passing completely through said panel opening in the assembling operation. The lateral projections 66 are positioned nearer to the trailing end of the securing device and are offset below said base 64 a distance slightly less the thickness of the panel A such that said lateral projections 66 are adapted for resilient engagement with marginal portions of the panel opening 2 at the outer or forward side of the panel A in cooperation with the ends of the base 64 engaging the rearward side of said panel A adjacent said panel opening 2, as aforesaid. Preferably the edges of said lateral projections 66 are rounded or flared outwardly to provide tapered cam surfaces on said edges, and the extremities of the base 64 bent outwardly to provide blunt rounded surfaces 68 which facilitate the attachment thereof in the panel opening 2.

Figure 9:
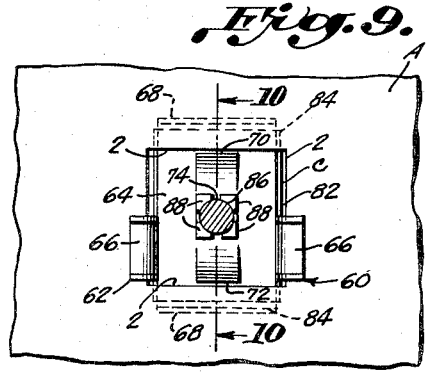
Fig. 9 is a view on line 9—9 of Fig. 8 looking in the direction of the arrows, and shows the attachment of the securing device in the panel opening as seen from the forward side of said panel.
Figure 11:
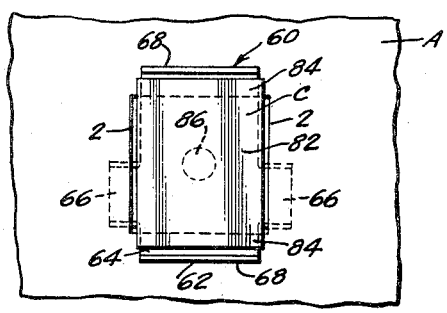
Fig. 11 is a vertical elevational view from the right of Fig. 8 and shows the attachment of the securing device in the panel opening as seen from the rearward side of the panel.
Figure 10:
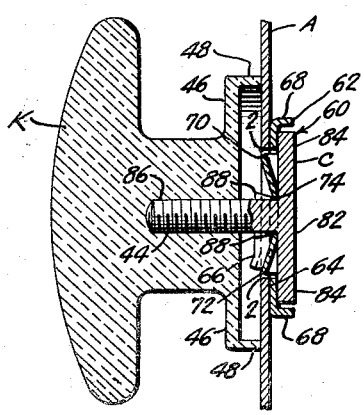
Fig. 10 is a sectional view of Fig. 9 on line 10—10, looking in the direction of the arrows.

The base 64 is provided with spaced locking shoulders or detents 70, 72, projecting from the underface thereof in opposite relation to the approximate center of said base 64, and having a spacing slightly less than the length of said panel opening 2 so as to be receivable therein in abutting relation to the adjacent edges of said panel opening 2, as seen in Figs. 8 and 9. The locking shoulders or detents 70, 72, may be formed in any suitable way and in the present example, each is shown provided by a depression adjacent a transverse slit in said base 64 with the metal adjacent said slit pressed out of the plane of the base 64 so that the projecting edge of said depression, Fig. 10, defines said detents or abutments 70 and 72.

Figure 12:
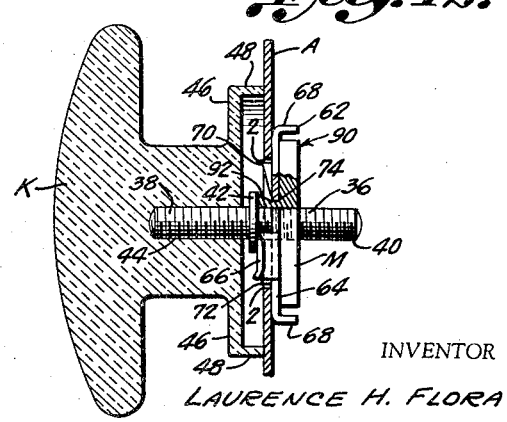
Fig. 12 is a sectional view similar to Fig. 10 showing a further form of securing device in accordance with the invention comprising a nut providing a mounting for a knob or handle, or the like, in the manner shown in Figs. 8–11, inclusive.

The base 64 of the clip is suitably formed for retaining the selected type of clamping member such as a bolt C as shown in Figs. 7–11, inclusive, or a nut M as seen in Fig. 12. In the example of Figs. 7–11, inclusive, the base 64 of the clip is provided with a central hole 74, Fig. 10, for connection to a clamping member in the form of a bolt C having a head 82 defining end flanges 84 extending to a size greater than the length of the panel opening 2 and a shank 86 provided with deformable lugs 88 spaced around said bolt shank 86 adjacent said bolt head 82. The deformable lugs 86 are provided in an initial generally square or rectangular formation for reception in the correspondingly shaped hole 74 in the base 64 of the clip to project from the underface thereof where they are deformed to stake said bolt C to said clip 62 in fixed nonrotatable relation therewith.

The securing device 60 is initially applied to attached position in the panel opening 2 by using the bolt shank 86 for manipulating the same in a manner to pass the leading end 84 of the bolt head and base 62 of the clip through the panel opening 2 from the forward side of said panel A to the rearward side thereof until limited by the lateral projections 66 engaging marginal portions of the panel opening 2 at the forward side of said panel A. In this position, the trailing end 84 of the bolt head and base 64 of the clip are aligned to clear the panel opening 2 and pass through said panel opening 2 to the rearward side of said panel A. The securing device 60 is then shifted reversely to the position shown in Fig. 8 where the locking shoulders or detents 70, 72, projecting from the underface of the base 64 of the clip, snap into the panel opening 2 and are seated in abutting relation to the adjacent edges of said panel opening 2 to lock the securing device 60 in attached fastening position on said panel A. The bolt shank 86 thus projects from the outer or forward side of said panel A where the similar knob or handle K is threaded onto said projecting bolt shank 86 to complete the mounting thereof on said panel A, or a cooperating nut applied to said projecting shank 86 to secure an object or part to said panel A.

Fig. 12 shows another form of the invention in which the securing device 90 comprises a clamping member in the form of a nut M and an attaching clip member 62 similar to that described with reference to Figs. 7–11, inclusive. The nut member M includes an integral hub 92 of generally rectangular cross section which is received in the correspondingly shaped generally rectangular hole 74 in the base 64 of the clip to project from the underface thereof where it is staked to retain said nut M in fixed nonrotatable relation with said clip 62.

The securing device 90, thus provided, is readily adapted for use in the manner of a blind fastener which is attached sustantially as described with reference to the form of invention disclosed in Figs. 1–5, inclusive, in a similar operation by which said securing device 90 is applied from the forward side of the panel A to attached fastening position at the rearward side thereof where a bolt is threaded into the nut M for securing an object or part to said panel A.

A tool, likewise, may be employed having a threaded end adapted to be threaded into the hub 92 on the nut M for manipulating the securing device 90 to attached position in the panel opening 2, or the equivalent of such a tool provided by a similar bolt 36 having one end 38 threaded into a bore 44 in the knob or handle K and the other end 40 adapted to be threaded into said hub 92 on said nut M to the extent limited by an integral lug or ring 42 defining a stop on said bolt 36. The knob or handle K may be of a similar construction comprising a bore 44 and a flange 46 carrying a peripheral skirt 48 providing suitable clearance of said flange 46 from the securing device 90 when attached in the panel opening 2 and otherwise concealing said securing device 90 in the completed mounting of the knob K. In attaching the securing device 90, the projecting end 40 of the bolt 36 is extended to the required length by unscrewing the bolt end 38 from the bore 44 in the knob K as necessary for attaching said securing device 90 in the procedure described with reference to Figs. 1-5, inclusive. The securing device 90 is thus manipulated to the position shown in Fig. 12 where the locking shoulders or detents 70, 72, on the base 64 of the clip snap into the panel opening 2 and are seated in abutting relation to the adjacent edges thereof to lock said securing device 90 in attached fastening position in said panel opening 2.

The bolt 36 is then drawn up by turning the same with the knob K to thread the free end 40 of the bolt 36 into the hub 92 on said nut M until limited by the stop 42, whereupon the knob K is fully threaded onto the other end 38 of said bolt until the skirt 48 of said knob K is in firm, bearing engagement with the panel A to complete the mounting of said knob K on said panel. The securing device 90 may, otherwise, be applied in a similar manner using a tool having an end portion threaded into the hub 92 on said nut M, and when said securing device 90 is fully attached in the panel opening 2, the tool is removed to clear said nut M for application of a cooperating bolt thereto to secure an object or part to said supporting panel A.

The clip or attaching member in any form of securing device in accordance with the invention preferably is constructed of relatively thin sheet metal the thickness of which is selected according to service requirements and the predetermined size of the parts of the assembly to be secured. The clip or attaching members are most effective when provided of spring metal suitably tempered and otherwise treated to give the desired toughness and hardness. Cheap and highly effective constructions of the clips or attaching members may be provided from cold rolled metal such as cold rolled steel which is untempered but of a spring metal nature and capable of providing strong, durable and reliable securing devices as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A mounting device for assembly in an opening in a supporting panel from one side only of the panel comprising, a sheet metal clip having a generally flat base including abutment surfaces on opposite ends of said base and adapted to pass through the panel opening from the forward side of the panel to fastening position wherein said abutment surfaces are in engagement with marginal portions of the panel at the rearward side thereof, lateral wings on said base extending outwardly from side edge portions of said base for engaging the forward side of the panel adjacent the opening therein, a threaded member detachably secured to said base in non-rotatable relation and adapted to be retained by said clip in the panel opening, a pair of spaced shoulders projecting forwardly from the underface of said base between said lateral wings, said shoulders being disposed in inwardly spaced relation from the terminal edges of said base and in inwardly spaced relation from said lateral wings, said mounting device being adapted to be inserted in tilted position through the forward side of the panel opening with the leading one of the end portions of said base and an associated one of said shoulders being received through the panel opening and with said lateral wings bearing against the front surface of the panel, after which the clip is adapted to be rotated to pass the trailing one of the end portions of the base through the opening and position the base of the clip generally parallel to the panel, and then the clip is adapted to be shifted in the direction of said trailing end portion whereby said shoulders are receivable in the panel opening in generally abutting relation to confronting edge portions of the opening to lock the mounting device in attached position in the panel opening, and outwardly extending cam surfaces on said end portions of said base and on said lateral wings for facilitating the movement of said mounting device to attached position.

2. A mounting device in accordance with claim 1, wherein said threaded member comprises a forwardly protruding extension projecting through an aperture in said base, said extension defining said shoulders for locking said mounting device in the panel opening.

3. A mounting device in accordance with claim 2, wherein said extension of said threaded member is of generally polygonal exterior configuration and wherein said aperture in said base is complementally formed with respect to the adjacent confronting surfaces of said extension to aid in preventing relative rotary movement between said base and said threaded member.

4. A mounting device in accordance with claim 1 wherein said threaded member comprises a nut detachably secured in non-rotatable relation to said base with the threaded portion of said nut disposed in axial alignment with an aperture through said base, and a bolt threaded on both ends and having an intermediate stop, one end of said bolt being threaded into said nut to the limit of said stop.

5. A mounting device in accordance with claim 1, wherein said shoulders are formed from portions of said generally flat base, projecting outwardly of the plane of the underface thereof.

References Cited in the file of this patent

UNITED STATES PATENTS

| | | |
|---|---|---|
| 2,552,782 | Hall | May 15, 1951 |
| 2,572,588 | Bedford | Oct. 23, 1951 |
| 2,605,806 | Tinnerman | Aug. 5, 1952 |
| 2,626,772 | Flora | Jan. 27, 1953 |
| 2,635,667 | Murphy | Apr. 21, 1953 |
| 2,745,458 | Bedford | May 15, 1956 |